(12) United States Patent
Saha et al.

(10) Patent No.: US 10,558,766 B2
(45) Date of Patent: Feb. 11, 2020

(54) METHOD FOR MODELICA-BASED SYSTEM FAULT ANALYSIS AT THE DESIGN STAGE

(71) Applicant: Palo Alto Research Center Incorporated, Palo Alto, CA (US)

(72) Inventors: Bhaskar Saha, Redwood City, CA (US); Tomonori Honda, Redwood City, CA (US); Ion Matei, Mountain View, CA (US); Daniel G. Bobrow, Palo Alto, CA (US); Johan Dekleer, Los Altos, CA (US); William C. Janssen, Mountain View, CA (US); Tolga Kurtoglu, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 374 days.

(21) Appl. No.: 15/392,196

(22) Filed: Dec. 28, 2016

(65) Prior Publication Data

US 2017/0193143 A1    Jul. 6, 2017

Related U.S. Application Data

(60) Provisional application No. 62/273,805, filed on Dec. 31, 2015.

(51) Int. Cl.
*G06F 11/36* (2006.01)
*G06F 17/50* (2006.01)
(Continued)

(52) U.S. Cl.
CPC ..... *G06F 17/5009* (2013.01); *G05B 23/0256* (2013.01); *G06F 11/004* (2013.01);
(Continued)

(58) Field of Classification Search
CPC .... G06Q 10/0635; G06N 20/00; G06N 7/005; G06N 7/02; G06N 7/023; G06N 7/026; G06F 17/5009; G06F 11/0751; G06F 11/008; G06F 11/2257; G06F 11/079; G06F 11/26; G06F 11/261; G06F 11/263; G05B 23/0243; G05B 23/0248; G05B 23/0251; G05B 23/0256; G05B 23/0278
See application file for complete search history.

(56) References Cited

U.S. PATENT DOCUMENTS 5,161,158 A * 11/1992 Chakravarty ....... G06F 11/2257
714/26
5,561,762 A * 10/1996 Smith ................. G06F 11/2257
714/33

(Continued)

OTHER PUBLICATIONS

Wikipedia's Wear historical version published Dec. 30, 2015 https://en.wikipedia.org/w/index.php?title=Wear&oldid=697433867 (Year: 2015).*

(Continued)

*Primary Examiner* — Joseph O Schell
(74) *Attorney, Agent, or Firm* — Fay Sharpe LLP

(57) ABSTRACT

A new and/or improved method, apparatus and/or system is disclosed which aids in extending correct behavioral models to include fault modes and in fault mode analysis of components and/or systems in simulated model environments, including, e.g., FMEA and FMECA and diagnostic fault tree generation.

14 Claims, 5 Drawing Sheets

(51) Int. Cl.
*G06F 11/00* (2006.01)
*G06F 17/18* (2006.01)
*G05B 23/02* (2006.01)
*G06N 7/00* (2006.01)
*G06N 7/02* (2006.01)
*G06N 20/00* (2019.01)

(52) U.S. Cl.
CPC ............ *G06F 11/008* (2013.01); *G06F 17/18* (2013.01); *G05B 23/0243* (2013.01); *G05B 23/0248* (2013.01); *G06N 7/005* (2013.01); *G06N 7/02* (2013.01); *G06N 7/023* (2013.01); *G06N 20/00* (2019.01)

(56) References Cited

U.S. PATENT DOCUMENTS

| | | | | |
|---|---|---|---|---|
| 8,713,490 | B1* | 4/2014 | Allen-Ware | G06F 17/5009 700/108 |
| 2004/0059694 | A1* | 3/2004 | Darken | G06Q 10/06 706/21 |
| 2008/0141072 | A1* | 6/2008 | Kalgren | G01D 3/08 714/33 |
| 2010/0100404 | A1* | 4/2010 | Hodges | B01J 19/002 705/7.31 |
| 2011/0046842 | A1* | 2/2011 | Smith | G07C 5/006 701/31.4 |
| 2012/0317058 | A1* | 12/2012 | Abhulimen | G06N 20/00 706/2 |
| 2013/0073271 | A1* | 3/2013 | Xiang | G05B 23/0248 703/6 |
| 2015/0051890 | A1* | 2/2015 | Saha | G06F 8/35 703/6 |
| 2016/0116368 | A1* | 4/2016 | Cornelius | G01M 99/002 702/34 |
| 2016/0232450 | A1* | 8/2016 | Chen | G06N 20/00 |

OTHER PUBLICATIONS

Kleer, et al.; "Fault Augmented Modalica Models", Palo Alto Research Center, Palo Alto, California, pp. 71-78, published Oct. 1, 2013.

Saha, et al., "A Model-Based Approach for an Optimal Maintenance Strategy", Intelligent Systems Laboratory, Palo Alto, California, pp. 1-11, (published 2014).

Honda, et al., "A Simulation and Modeling Based Reliability Requirements Assessment Methodology", Intelligent Systems Laboratory, Palo Alto, California, pp. 15-26, (published 2014).

* cited by examiner

METHOD FOR MODELICA-BASED SYSTEM FAULT ANALYSIS AT THE DESIGN STAGE

REFERENCE TO RELATED APPLICATION

This application claims priority to, and the benefit of, U.S. Provisional Patent Application Ser. No. 62/273,805, filed on Dec. 31, 2015, entitled METHOD FOR MODELICA-BASED SYSTEM FAULT ANALYSIS AT THE DESIGN STAGE, the entirety of which application is hereby incorporated by reference.

BACKGROUND

The present inventive subject matter relates generally to the art of cyber-physical component and/or system modeling. Particular but not exclusive relevance is found in connection with object-oriented and/or other like modeling computer languages, e.g., such as Modelica, etc. The present specification accordingly makes specific reference thereto at times. However, it is to be appreciated that aspects of the present inventive subject matter are also equally amenable to other like applications and/or environments.

In general, the availability of models of correct behavior is beneficial to successful model-based approaches for diagnosis, repair, reconfiguration, etc. For many diagnostic algorithms, the behavioral models are expressed in First-Order Predicate Calculus (FOPC) or one of its equivalents. Often, such models can be difficult to obtain from system designers. Modelica is one suitable modeling language for Cyber-Physical systems. The open source MSL includes models of approximately 1280 components in domains including electronics, mechanics and fluids. Generally, the MSL describes correct component behavior, not faulty behavior. Nevertheless, the knowledge of fault modes can greatly improve diagnostic precision.

In general, a new and/or improved method, apparatus and/or system is disclosed which aids in extending correct behavioral models to include fault modes and in fault mode analysis of components and/or systems in simulated model environments, including, e.g., FMEA and FMECA and diagnostic fault tree generation.

BRIEF DESCRIPTION

This Brief Description is provided to introduce concepts related to the present inventive subject matter. The summary is not intended to identify essential features of the claimed subject matter nor is it intended for use in determining or limiting the scope of the claimed subject matter. The embodiments described below are not intended to be exhaustive or to limit the invention to the precise forms disclosed in the following detailed description. Rather, the embodiments are chosen and described so that others skilled in the art may appreciate and understand the principles and practices of the present inventive subject matter.

Disclosed examples include a method to predict failure of a system. The method includes analyzing the system to identify fault susceptible components of the system, augmenting component models of the of the fault susceptible components with fault modes, using the augmented component models to simulate faults to determine a system-level severity, applying parameterized physics-of-failure models corresponding to a root cause of the simulated faults to predict fault likelihood, combining the system-level severity with the predicted fault likelihood to predict component degradations over time, and aggregating the predicted component degradations to predict when the system will fail to meet performance requirements.

In the example above, a fault mechanism may represent a high-level category, and the high level category may include subclasses. The high-level category may be wear, and the sub-classes of wear may include: abrasive wear, impact wear, and corrosive wear. The prediction of when the system will fail to meet the performance requirements further may include using a set of initial conditions, faults and component ages to determine a conditional probability that the system meets a requirement. The prediction of when the system will fail to meet the performance requirements may include using a set of initial conditions, faults and component ages for all but one of the components to determine an age of the remaining component. The prediction of when the system will fail to meet the performance requirements may be used to optimize the design of the system or components, or to optimally select among possible subsystem/component options from vendors. The design may be optimized by an explicit quantitative Fault Modes, Effects and Criticality Analysis (FMECA) obtained by combining the system-level severity of faults with the predicted fault likelihood. The prediction of when the system will fail to meet the performance requirements may include a mean time to failure. The prediction of when the system will fail to meet the performance requirements may include a full probability distribution. The prediction of when the system will fail to meet the performance requirements may include a full probabilistic trajectory of system dynamics.

Another disclosed example includes an apparatus to predict failure of a system. The apparatus includes one or more processors configured for: analyzing the system to identify fault susceptible components of the system, augmenting component models of the of the fault susceptible components with fault modes, using the augmented component models to simulate faults to determine a system-level severity, applying parameterized physics-of-failure models to the simulated faults to predict fault likelihood, combining the system-level severity with the predicted fault likelihood to predict component degradations over time, and aggregating the predicted component degradations to predict when the system will fail to meet performance requirements.

Numerous advantages and benefits of the inventive subject matter disclosed herein will become apparent to those of ordinary skill in the art upon reading and understanding the present specification. It is to be understood, however, that the detailed description of the various embodiments and specific examples, while indicating preferred and/or other embodiments, are given by way of illustration and not limitation. Many changes and modifications within the scope of the present invention may be made without departing from the spirit thereof, and the invention includes all such modifications.

BRIEF DESCRIPTION OF THE DRAWINGS

The following detailed description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

DETAILED DESCRIPTION

For clarity and simplicity, the present specification shall refer to structural and/or functional elements, relevant standards, algorithms and/or protocols, and other components, algorithms, methods and/or processes that are commonly known in the art without further detailed explanation as to their configuration or operation except to the extent they have been modified or altered in accordance with and/or to accommodate the preferred and/or other embodiment(s) presented herein. Moreover, the apparatuses and methods disclosed in the present specification are described in detail by way of examples and with reference to the figures. Unless otherwise specified, like numbers in the figures indicate references to the same, similar or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific materials, techniques, arrangements, etc. are either related to a specific example presented or are merely a general description of such a material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to the figures.

Works related to the present specification, all of which are explicitly incorporated herein by reference in their entirety, include:

U.S. patent application Ser. No. 13/967,503, filed Aug. 15, 2013, of Saha, et al.;
The document attached hereto as Appendix A;
The document attached hereto as Appendix B;
The document attached hereto as Appendix C; and
The document attached hereto as Appendix D.

Figure 4:
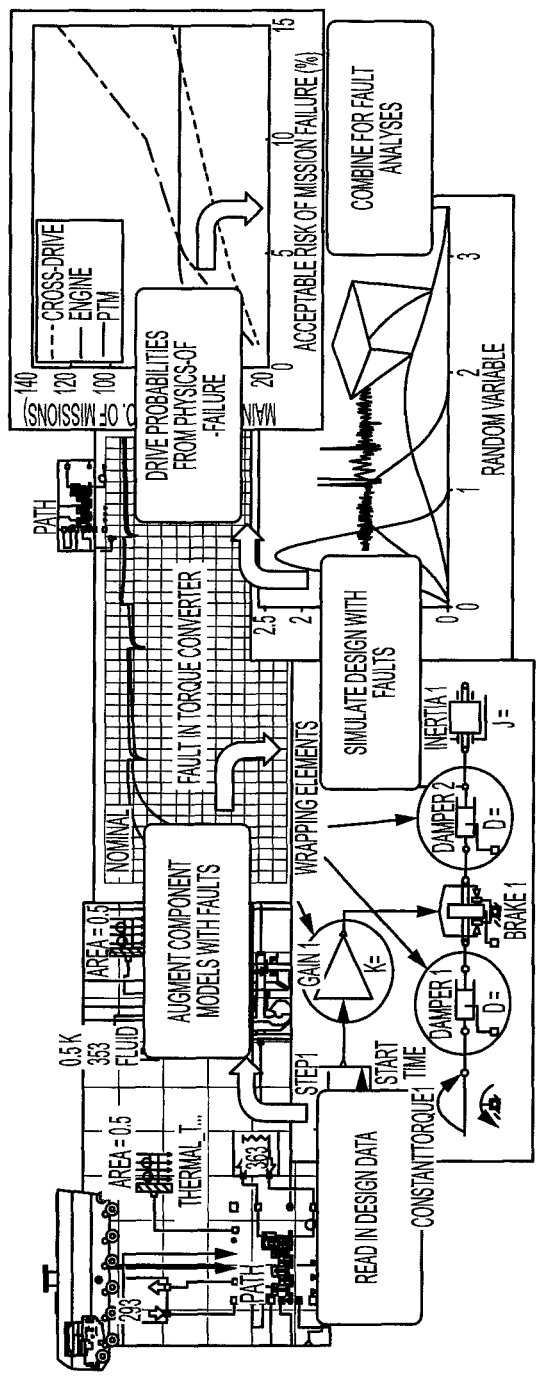
FIG. 4 illustrates an exemplary FAME fault-analysis workflow.

In general, there is disclosed herein a method, system and/or apparatus which is operative to conduct and/or coordinate a model-based design flow that lets user (e.g., such as system designers) adapt their designs through a tightly integrated build-test-modify loop with multiple points of feedback. In order for this workflow to yield highly resilient system designs, suitably, designers are provided the ability to analyze faults, fault propagation, and system-level impact. This capability complements the decision-making process that designers commonly subscribed to, and assists them in eliminating potential adverse impact of faults on system functionality by systematic exploration of faults. In one embodiment, FAME-based fault analysis technology provides this capability. With reference to FIG. 4, suitably, behind the scenes, the FAME method, system and/or apparatus operates to automatically:

Analyze a design to identify potential fault susceptible components;
Augment component models with domain-relevant fault modes;
Simulate all faults to determine system-level severity;
Apply parameterized physics-of-failure models to predict fault likelihood;
Combine fault severity and likelihood to predict component degradation over time; and
Aggregate component-level predictions to predict when the system will fail to meet performance requirements.

Figure 5:
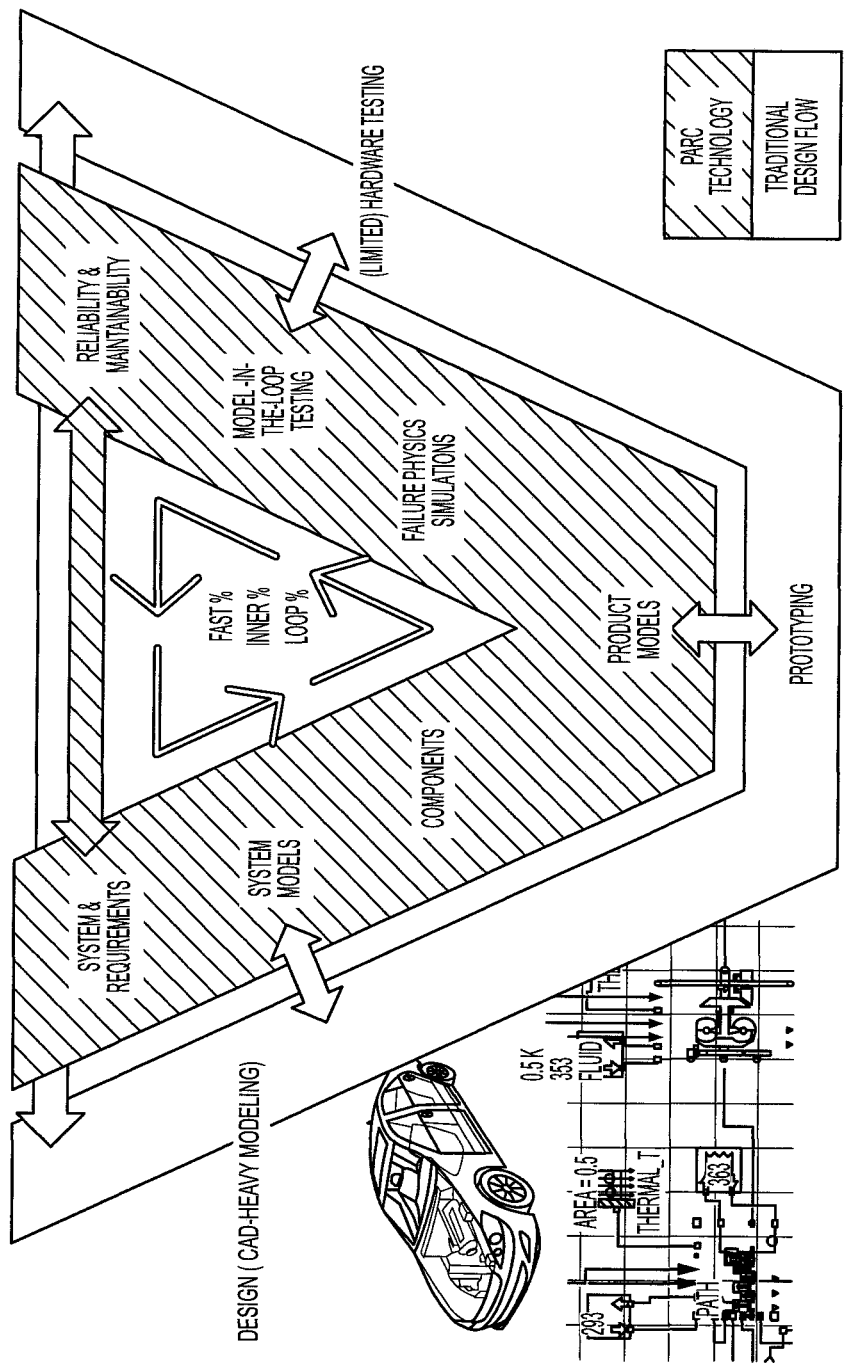
FIG. 5 illustrates an exemplary Fault-Aware Design Iteration (FADI) process.

With reference now to FIG. 5, in the traditional design-build-test design flow, reliability issues often do not surface until the full system has been designed, parts have been made and expensive subsystem or full system level testing is performed. At later stages in the design flow, changing a part or subsystem significantly impacts the total design, potentially increasing both cost and time. In a broader sense, this weakness of the traditional design flow reflects the disconnect between system requirements and system modeling that often leads to requirements that are not achievable, or to a system that only partially meets the original requirements, or a system that meets the requirements but at a much higher cost with significant time-to-market delays. The FADI process (suitable incorporated in an exemplary embodiment of the present method, system and/or apparatus) addresses this disconnect by allowing designers to model the impact of component faults on system performance in various design configurations. The FADI process enables designers, both at large OEMs (Original Equipment Manufacturers) and SMEs (Small and Medium Enterprises), to evaluate design performance, reliability and manufacturability against pre-determined metrics directly extracted from the system requirements. Rapid iteration with FAME earlier in the design process can significantly reduce the re-design and post-manufacturing warranty costs and insure closer adherence to system requirements. It can also provide better predictability of system reliability and service intervals. Ultimately, the FADI process allows a design to go into production with designed-in reliability, thus reducing cost and time-to-market.

In one suitable embodiment, there is included a method, apparatus and/or system which is operative to augment models of physical system components with fault and/or other non-nominal modes. Suitably, models including the fault and/or other non-nominal modes are automatically or semi-automatically generated from models of the components which otherwise describe only the nominal or correct behaviors of the components. Note, as used herein FAME is an acronym for Fault-Augmented Model Extension. However, it is to be appreciated that the augmented models may be extended as described herein to include other alternate modes that are not "fault" related strictly speaking, but are rather related to other non-nominal or alternate operating modes.

In one exemplary embodiment, the fault augmented models are used in one or more of a wide variety of diagnostic applications (e.g., including Fault Mode and Effects Analysis (FMEA) and Failure Mode Effects and Criticality Analysis (FMECA)) and to generate diagnostic fault trees.

Figure 1:
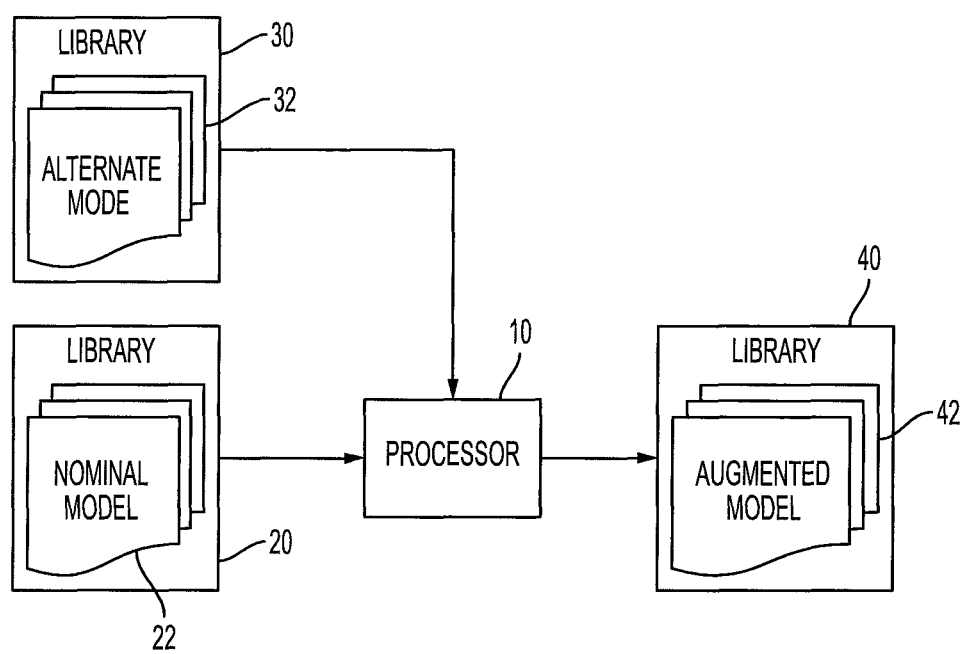
FIG. 1 is a diagrammatic illustration showing an exemplary model transformation system suitable for practicing aspects of the present inventive subject matter.

With reference now to FIG. 1, there is shown in general a computer 10 or other like processor which executes or otherwise performs a model transformation process, e.g., either automatically or semi-automatically. Input thereto is a first library 20 of nominal component models 22. For example, the library 20 may include a collection of models 22, in which each model 22 describes and/or otherwise represents a physical component, e.g., including the operation and/or behavior of the component. Suitably, the library 20 may include one or more such models 22, e.g., representing components that are to be employed and/or interact together in a system, or the library 20 may include some other suitable collection of such models 22. In practice, each model 22 in the input library 20 may comprise and/or be represented by lines of code (e.g., written in the Modelica language or another such suitable language) or the like stored in a file or otherwise in a suitable memory or other data storage device accessible by the computer or processor 10. Suitably, at least one of the models 22 (but alternately more or all of the models 22) in the library 20 describes or otherwise simulates only a nominal operation and/or behavior of the physical component modeled thereby, e.g., such nominal operation and/or behavior may correspond to the correct operation and/or behavior of the modeled component. In one simple example, the library 20 may include only one model 22, and in more complex examples, it may include a great many models 22.

As another input, a second library 30 may include a collection of salient alternate modes and/or mechanisms 32 applicable to the modeled components of the library 20. For example, each alternate mode and/or mechanism 32 of the library 30 may describe and/or represent a fault mode and/or mechanism or some other non-nominal or alternate mode of operation and/or behavior. In practice, each alternate mode 32 may be applicable to one or more modeled components in the library 20, while potentially not being applicable to others. For example, a short circuit fault mode may be applicable to a number of different electronic components (e.g., such as a capacitor and/or inductor), while not being applicable to mechanical components (e.g., such as a brake). Suitably, each alternate mode 32 in the input library 30 may comprise and/or be represented by lines of code (e.g., written in the Modelica language or another such suitable language) or the like stored in a file or otherwise in a suitable memory or other data storage device accessible by the computer or processor 10. For example, a fault mechanism can be used to express an underlying cause of a fault, while a fault mode can be used to express the abnormal operation or behavior of a component being modeled. Consider, for purposes of illustration, the exemplary fault mechanisms of a rusty shaft and a disconnected lead wire in relation to a motor which is being modeled. The corresponding fault modes resulting from the aforementioned mechanisms may be a shaft that is harder to turn (i.e., as compared to when the motor is otherwise operating normally) and a motor that simply does not run, respectively. Examples of fault mechanism include: corrosion, wear, metal fatigue, leaking, slipping, open/short (and equivalents).

In one suitable embodiment, for example, fault modes and mechanisms may be captured and/or otherwise identified for each subject component being modeled. These may be organized, optionally along with fault probabilities, in a suitable taxonomy so that corresponding behavioral models can be built consistently. Accordingly, a fault mechanism behavior schema may in turn be developed in view of the aforementioned taxonomy. For example, the schema may define faulty behavior at the highest abstraction level in a generic sense and use the concept of inheritance to specify behavior for the lower-level fault mechanisms. This approach allows for flexibility in defining behavior for subclasses of fault mechanisms. Consider the case of a fault mechanism identified as "wear." This may represent a high-level category of different subclasses of wear, e.g., such as abrasive, impact or corrosive wear. Suitably then, the subclasses (of wear in this example) inherit and expands upon the higher-level behavior. For example, the behavior of wear representing a loss of material is expanded to include, e.g., the frictional behavior in the subclass of abrasive wear. The result of this process is that fault modes for different components can call upon the same fault mechanism, i.e., underlying faulty behavioral model. Moreover, these subclasses may cover the expression of a fault mechanism in different domains, e.g., such as mechanical, hydraulic, electronic, etc.

Of course, more broadly, an alternate mode may not represent faulty operation and/or behavior at all but rather may simply represent some other non-nominal operation and/or behavior of the component being modeled (e.g. swapping out the 'small-signal' model of a transistor for the 'large-signal' model).

In any event, the processor 10 generates and/or otherwise outputs a library 40 of augmented component models 42. In practice, each model 42 in the output library 40 may comprise and/or be represented by lines of code (e.g., written in the Modelica language or another such suitable language) or the like output to a file or otherwise which is stored in a suitable memory or other data storage device accessible by the computer or processor 10. Suitably, in accordance with the model transformation process executed by the computer and/or processor 10, an augmented component model 42 is output for each input nominal component model 22 from the library 20, with the augmented component models 42 including a description and/or representation of not only the nominal operation and/or behavior of the modeled component but also including a description and/or representation of one or more or all of the alternate modes of operation and/or behavior applicable to the component being modeled. Suitably, the output augmented component models 42 of the library 40 are fully compatible with their corresponding input nominal component models 22, e.g., in terms of their interfaces, inputs, outputs and parameters. Accordingly, for example, the augmented component models 42 may simply be plugged-in to and/or replace the nominal component models 22 for testing and/or analysis of fault and/or other alternative modes of operation and/or behavior of various components.

Figure 2:
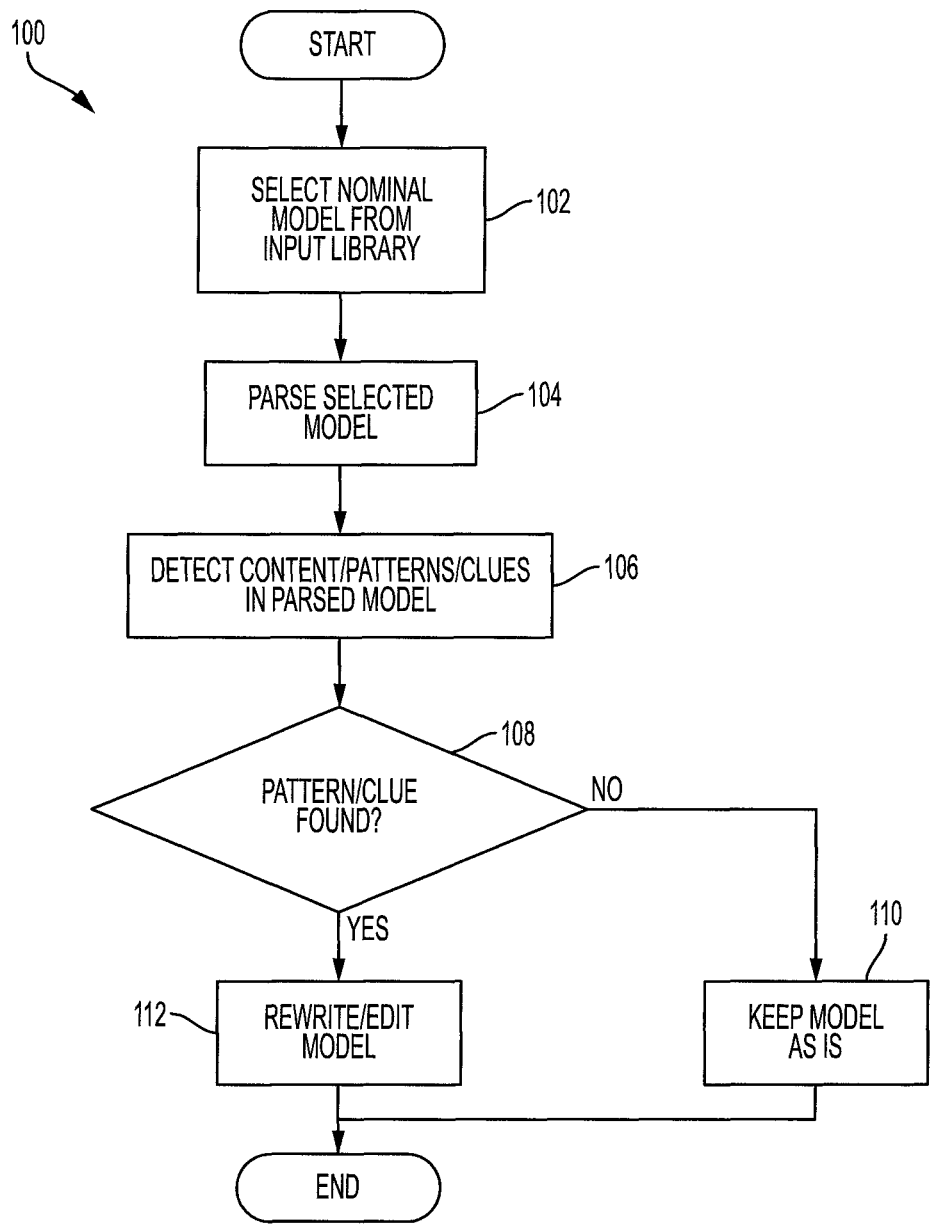
FIG. 2 is a flow chart showing an exemplary method for performing a model transformation process in accordance with aspects of the present inventive subject matter.

In one exemplary embodiment, the computer and/or processor 10 may execute a computer program or the like (e.g., stored in a suitable memory or other data storage device accessible by the computer/processor 10) to carry out the aforementioned model transformation process. FIG. 2 is a flow chart illustrating steps of one suitable embodiment of the model transformation process 100. Optionally, the aforementioned program executed by the computer/processor 10 may be written in a general-purpose, class-based, object-oriented computer programming language, e.g., such as a Java or the like, which incorporates the JModelica platform or the like and the Java/JastAdd parser or the like. Suitably, the program runs over the input library 20 and recognizes those nominal component models 22 which are susceptible the various faults and/or alternate modes 32 of the library 30, e.g., by identifying specified patterns associated with the respective alternate modes 32 in the variables, equations and/or other content of the models 22. That is to say, if the variables, equations and/or other content of a given model 22 match (e.g., within a given tolerance) a specific pattern which is associated with a given alternate mode 32, then that alternate mode 32 is deemed applicable to the given model 22. Consequently, the model 22 is in essence rewritten to include a description of the applicable alternate mode 32, and the new augmented model 42 is output.

Referring now more specifically to FIG. 2, the model transformation process 100 suitably begins at step 102, with the reading in of one of the models 22 from the library 20.

At step 104, the model 22 is parsed, and at step 106, the parsed model is examined and/or analyzed to look for specified content, patterns and/or clues therein which are associated with an alternative mode 32. In practice, a given model 22 will generally comprises one or more lines of code, including, e.g., equations, parameters, variables and/or other content, which defines the component being modeled along with its nominal operation and/or behavior. From this content, clues and/or patterns can be detected and/or discerned which match (e.g., within some degree of tolerance) certain content, clues and/or patterns associated with faults and/or other non-nominal or alternate modes. To illustrate, the content may include elements, clues or patterns which suggest that a given model 22 describes an electrical component, e.g., such as a capacitor. Indeed, the model 22 may include an equation or parameter or other content from which it can be determined that the model 22 is in fact a capacitor. To continue with the example, it may be known that this type of component, i.e., an electrical component in general and more specifically a capacitor, is susceptible to certain faults and/or certain alternate modes are applicable thereto, e.g., a short or an open circuit, etc. That is to say, the content of the model 22 sufficiently matches a pattern associated with the respective fault and/or alternate mode 32.

At decision step 108, if no pattern and/or clues are found which sufficiently match those sought, then the process 100 branches to step 110, otherwise if a pattern is found, then the process 100 continues to step 112.

At step 110, the model 22 is essentially left unaltered. That is to say, the model 22 may be essentially left as is. In this case, the corresponding model 42 in the output library 40 will be essentially the same as the input model 22.

Conversely, at step 112, the model 22 is rewritten and/or edited into a new model 42 so as to describe, not only the nominal mode of operation originally contained in the model 22, but also to describe the alternate mode associated with matched pattern.

In practice, it is to be appreciated that suitably each model 22 of the input library 20 is so processed, e.g., in turn or in parallel. Additionally, it is to be appreciated that in practice each model 22 may be susceptible to zero or one or more of the faults and/or alternate modes 32 described in the library 30. That is to say, the content of the model 22 may match none or one or more different patterns associated with the various faults and/or other alternate modes 32.

Suitably, upon rewriting (or editing) of a model 22 to include alternate modes (i.e., to achieve the corresponding augmented model 42), the description of and/or code for each applicable alternate mode may be injected or otherwise inserted into the model. For example, that description or code may be obtained from the applicable alternate modes 32 and may include one or more equations and/or functions which represent and/or model the alternate mode in question. In practice, every model class definition which contains faults or alternate modes is replaced with a new class definition, e.g., a Modelica model class subsuming the original model class and adding behavior to allow simulation of the faults and/or alternate modes. Additionally, the augmented model 42 is provided with a control mechanism and/or suitable code to permit the selection of the particular mode in which the model 42 will operate for a given simulation. That is to say, the aforementioned control mechanism and/or code allows the augmented model 42 to be selectively run in any one of the modes, be it the nominal mode from the original model 22 or one of the alternate modes added by the rewrite/editing. In this way, alternative dynamics are enabled for each operating mode.

FAME is based on the insight that most faulty behaviors are based on a few underlying fault mechanisms. In practice, the FAME method, apparatus and/or system takes nominal component behavior descriptions (e.g., from Modelica model libraries) and parameterizable fault mechanism models as input, and deploys a model transformation mechanism to automatically generate a comprehensive set of fault-inducible component models. This technique when applied to a system design comprising Modelica component models results in a fault-inducible design where the effects of component faults can be investigated at the system level. A rough estimate of the reduction in modeling effort may be had by analyzing faults at the component level. In one suitable embodiment, the FAME technology is capable of modeling more than approximately 7000 unique faults spanning approximately 1200 leaf-level components. Leaf-level components, for example, such as the Modelica Standard Library (MSL) clutch model (Modelica.Mechanics.Rotational.Components.Clutch), are those that are not assemblies of simpler components, i.e., the equation block in these Modelica models comprise dynamics equations rather than equations that denote connections between components. Component assemblies and other higher-level components inherit the fault behaviors of the components they are comprised of.

Suitably, the Modelica component fault models include a generic parameter named damage amount or a component-specific parameter (e.g. coefficient of friction for a brake) that determines the severity of the fault. The value of this parameter is determined by stochastic physics-of-failure models that capture the degradation or catastrophic fault modes of the associated components. These stochastic models are pre-simulated in a Monte Carlo framework incorporating model uncertainties as well as the expected spectrum of usage over the lifetime of the component. The results are stored as damage-parameter maps that are indexed by model material and geometric parameters and level of usage. Other sources of conditional damage probabilities are hardware-in-the-loop testing of components by manufacturers or system integrators, as well as maintenance/usage logs derived from field use.

In a suitable embodiment, the system-level Modelica models and simulations are detailed enough such that the variations in the component damage for any given age or usage shows up as distributions over the performance metrics.

Figure 3:
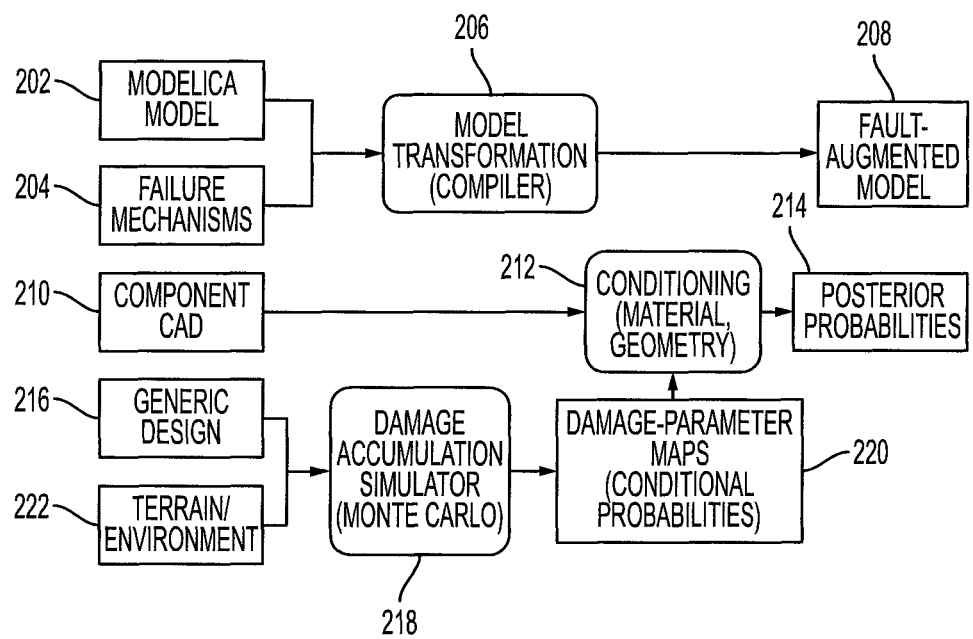
FIG. 3 illustrates an exemplary FAME (Fault-Augmented Model Extension) architecture in accordance with aspects of the present inventive subject matter.

FIG. 3 shows the basic architecture of this approach. More specifically, FIG. 3 shows Modelica model 202, failure mechanisms 204, CAD information 210, and generic design of vehicle 216 and terrain 222. The following procedures are described: (1) the compiler 206 constructs the fault augmented Modelica models 208, (2) the damage accumulation mechanism 218 constructs conditional probability distribution 220 and the probability update process 212 conditions the density function by the particular component design (extracted from CAD information) to produce posterior probabilities 214.

In alternate exemplary embodiments, the probabilistic damage estimates for components conditioned on usage may optionally be obtained by other means. In one optional embodiment, the usage of a system is expressed as a composition of smaller usage segments, e.g., U.S. federal drive cycles, military mission profiles, specific maneuvers for automotive systems such as acceleration, cruise, turns, and braking, etc. Accordingly, a Modelica model is constructed of the full system and it is simulated over realistic operating conditions to derive the loads on the components of interest. These loads are then used in a reliability model to estimate the extent of damage due to one maneuver or usage segment. Damage due to long term usage is then derived by mathematically accumulating (e.g., summing, integrating, etc.) the damage due to individual usage segments.

In another embodiment, the system Modelica model is simulated for one time step to derive the load for a component, e.g., the sliding distance for a clutch in an automotive powertrain model. Continuing with the foregoing example, the sliding distance is then input to a reliability model, e.g., such as Archard's Law for friction wear to generate the resulting slip factor for the coefficient of friction of the clutch (clutch damage or wear). This new value of the degraded clutch parameter is then used in the next simulation step of the powertrain Modelica model to determine its performance under component wear as well as to derive the new loads for the degraded component (i.e., the clutch in this example) itself.

In practice, this foregoing method may require running the Modelica models over long simulation time spans in order to accumulate enough damage such that the degraded component will fail. Optionally, Modelica simulation acceleration techniques are used here, e.g., such as running a large number of parallel Modelica simulations of the system each with a different damage amount, and then stitching the simulation results by matching the end values of key variables (after simulation) to the initialization values (before simulation), in order to derive a simulation trace of damage progressions over multiple usage segments.

In accordance with one suitable embodiment, faultable Modelica models are constructed for all the component models in the MSL. Each such faultable model includes both its original nominal behavioral description and all of its fault modes. Thus from any system that is built with the nominal (unfaulted) component models, the method, apparatus and/or system generates and/or builds a port to port equivalent system by substituting the faultable models for the originals. Accordingly, a user may selectively insert faults into the system by settings desired components to operate in a desired fault mode. Suitably, the fault augmented models are used for a wide variety of diagnostic applications including FMEA/FMECA and diagnostic fault tree generation.

For example, some uses of the fault-augmented models for both design and diagnostic purposes include:
Given a set of initial conditions, parameter values and faults, determine whether a system requirement is met.
Given a set of initial conditions, faults and component ages (e.g. the same age may be assumed for all components of a system), determine the conditional probability that the system meets a requirement.
Given a set of initial conditions, faults, observations, and ages for all but one of the components, determine the age of the remaining component.
Perform standard model-based diagnosis.
Do fault mode and effects analysis (FMEA).
Do failure mode effects and criticality analysis (FMECA).
Determine which components under fault conditions most effect whether a system meets requirements.
Determine mean-time-to-failure (MTTF).

In particular, the fault-augmented models may be simulated to answer the following questions:
Which wear/damage susceptible components in a system design are most likely to cause critical performance loss?
What Performance Metrics are most at risk?
In general, FMEA and FMECA quantify the likelihood and impact of each failure mode and guide the design effort to mitigate risk associated with critical failure modes. Simulation of fault scenarios using fault-augmented models allows automated generation of quantitative FMEA and FMECA analyses.

Exhaustive simulation of all possible fault modes aided by the fault-augmented models is used to generate the causality relations between component faults and failed system-level requirements, thus providing a method of deriving diagnostic fault trees at the design stage. In practice, each fault mode may be simulated with a varying degree of fault amount (e.g., linked stochastically to system usage) to derive a probabilistic fault tree.

Other exemplary embodiments support different diagnosis techniques. For example, a data driven approach serves as a way to generate data corresponding to a set of fault modes. In addition, unlike a typical system-theoretic diagnosis approach where a fault is seen as an exogenous signal, the fault-augmented models parameterize the fault signals, and create "feedback loops" that show how different variables affect other variables. For example, decreased friction in a worn clutch increases the load on the engine to maintain the same velocity for a vehicle. In this way, it induces more structure to the diagnosis problem. With such a representation, diagnosis techniques based on parameter estimation techniques, (unscented) Kalman filter, particle filters, etc. become more feasible.

Additionally, the fault augmented models may also serve in unsupervised learning when not only cluster creation is a goal, but also enhancing the clusters with physical meaning. Observed behaviors are related to particular fault modes (for example through parameter estimation techniques), therefore providing a path to observed behavior classification.

The above methods and/or apparatus have been described with respect to particular embodiments. It is to be appreciated, however, that certain modifications and/or alteration are also contemplated.

In any event, it is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, methods, functions, elements and/or components described herein may suitably be implemented via hardware, software, firmware or a combination thereof. In particular, the processor 10 may be embodied by a computer or other electronic data processing device that is configured and/or otherwise provisioned to perform one or more of the tasks, steps, processes, methods and/or functions described herein. For example, a computer or other electronic data processing device embodying the processor 10 may be provided, supplied and/or programmed with a suitable listing of code (e.g., such as source code, interpretive code, object code, directly executable code, and so forth) or other like instructions or software or firmware, such that when run and/or executed by the computer or other electronic data processing device one or more of the tasks, steps, processes, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

The invention claimed is:

1. A method to predict failure of a system, the method comprising:
    analyzing the system to identify fault susceptible components of the system;
    augmenting component models of the of the fault susceptible components with fault modes;
    using the augmented component models to simulate faults and to determine a system-level severity;
    applying parameterized physics-of-failure models corresponding to a root cause of the simulated faults to predict a fault likelihood;
    combining the system-level severity with the predicted fault likelihood to predict component degradations over time;
    aggregating the predicted component degradations to predict when the system will fail to meet performance requirements; and
    deriving a fault tree by simulating fault modes with a varying fault amount.

2. The method of claim 1, wherein the prediction of when the system will fail to meet the performance requirements further comprises using a set of initial conditions, faults and component ages to determine a conditional probability that the system meets a requirement.

3. The method of claim 1, wherein the prediction of when the system will fail to meet the performance requirements is used to optimize a design of the system or components, or to optimally select among possible subsystem/component options from vendors.

4. The method of claim 3, wherein the design is optimized by an explicit quantitative Fault Modes, Effects and Criticality Analysis (FMECA) obtained by combining the system-level severity of faults with the predicted fault likelihood.

5. The method of claim 1, wherein the prediction of when the system will fail to meet the performance requirements includes a mean time to failure.

6. The method of claim 1, wherein the prediction of when the system will fail to meet the performance requirements includes a full probability distribution.

7. The method of claim 1, wherein the prediction of when the system will fail to meet the performance requirements includes a full probabilistic trajectory of system dynamics.

8. The method of claim 1, wherein a fault mode of the fault modes is a short circuit.

9. The method of claim 1, wherein a fault mode of the fault modes is that a shaft is harder to turn than normal.

10. The method of claim 1, wherein the prediction of when the system will fail to meet the performance requirements is used to select among possible subsystem/component options.

11. The method of claim 1, wherein the fault amount is linked stochastically to system usage.

12. The method of claim 1, wherein the fault modes include a worn clutch, and the method further comprises creating a feedback loop that shows how the worn clutch increases a load on an engine to maintain a same velocity for a vehicle.

13. The method of claim 1, wherein the method further comprises creating a feedback loop showing how a fault mode of the fault modes affects a variable.

14. An apparatus to predict failure of a system, the apparatus comprising one or more processors configured for:
    analyzing the system to identify fault susceptible components of the system;
    augmenting component models of the of the fault susceptible components with fault modes;
    using the augmented component models to simulate faults and to determine a system-level severity;
    applying parameterized physics-of-failure models to the simulated faults to predict a fault likelihood;

combining the system-level severity with the predicted fault likelihood to predict component degradations over time; and aggregating the predicted component degradations to predict when the system will fail to meet performance requirements; and deriving a fault tree by simulating fault modes with a varying fault amount.

\* \* \* \* \*